United States Patent [19]

Biglione et al.

[11] 4,169,193
[45] Sep. 25, 1979

[54] PROCESS FOR PREPARING EXPANDIBLE POLY-STYRENE PARTICLES USEFUL FOR OBTAINING MOLDED BODIES HAVING A CELLULAR STRUCTURE

[75] Inventors: Gianfranco Biglione, Mantova; Guido Bertazzoni, Campitello di Marcaria; Antonió Alvares, Mantova, all of Italy

[73] Assignee: Montedison S.p.A., Milan, Italy

[21] Appl. No.: 916,249

[22] Filed: Jun. 16, 1978

Related U.S. Application Data

[63] Continuation-in-part of Ser. No. 820,243, Jul. 29, 1977, which is a continuation of Ser. No. 660,629, Feb. 23, 1976, abandoned, which is a continuation-in-part of Ser. No. 444,391, Feb. 21, 1974, abandoned.

[30] Foreign Application Priority Data

Feb. 22, 1973 [IT] Italy ............................... 20706 A/77

[51] Int. Cl.$^2$ ............................................... C08J 9/12
[52] U.S. Cl. .......................................... 521/56; 521/98; 521/131; 521/907
[58] Field of Search ............... 260/2.5 FP, 2.5 B; 521/56, 98, 131, 907

[56] References Cited

U.S. PATENT DOCUMENTS

| | | | |
|---|---|---|---|
| 3,271,333 | 9/1966 | Eichhorn | 260/2.5 FP |
| 3,324,076 | 6/1967 | Elder et al. | 260/45.7 R |
| 3,401,127 | 9/1968 | Stephenson | 260/2.5 FP |
| 3,576,770 | 4/1971 | Evans et al. | 260/2.5 FP |
| 3,631,132 | 12/1971 | Westemacher | 260/2.5 FP |
| 3,639,302 | 2/1972 | Brown et al. | 260/2.5 FP |
| 4,029,614 | 6/1977 | Nintz et al. | 260/2.5 FP |

*Primary Examiner*—Morton Foelak

[57] ABSTRACT

Expandible polystyrene particles useful for making molded bodies, particularly large blocks having a uniform cellular structure and a particularly short residence time in the mold, are prepared by polymerizing styrene in the presence of at least one ether having the general formula (III) or (IV):

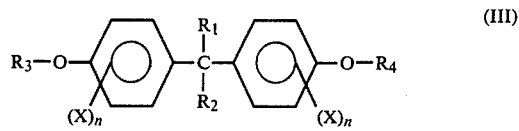

(III)

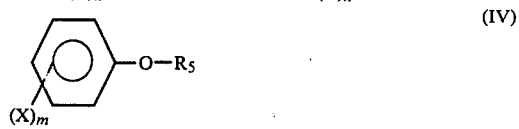

(IV)

wherein:
$R_1$ and $R_2$, which may be the same or different, are alkyl or cycloalkyl radicals and/or phenyl radicals, optionally halogen-substituted;
$R_5$ is a non-halogenated alkyl radical having 4 to 30 carbon atoms or a fully or partially halogenated alkyl radical having 9 to 30 carbon atoms;
X is a halogen or an alkyl radical, optionally halogenated, having 1 to 8 carbon atoms;
n is an integer from 0 to 4;
m is an integer from 0 to 5, and
$R_3$ and $R_4$, which may be the same or different, are alkyl radicals, optionally halogenated, having 1 to 30 carbon atoms, with the exception that, when $R_1$ and $R_2$ are alkyl radicals, X is bromine and n is 2, $R_3$ and $R_4$ are non-halogenated alkyl radicals having 1 to 30 carbon atoms, or fully or partially halogenated alkyl radicals having 9 to 30 carbon atoms.

7 Claims, No Drawings

PROCESS FOR PREPARING EXPANDIBLE POLY-STYRENE PARTICLES USEFUL FOR OBTAINING MOLDED BODIES HAVING A CELLULAR STRUCTURE

This application is a continuation-in-part of our application Ser. No. 820,243, filed July 29, 1977 as a Rule 60 Continuation of our application Ser. No. 660,629 filed Feb. 23, 1976 and now abandoned, and which was a continuation in-part of our application Ser. No. 444,391 filed Feb. 21, 1974, and now abandoned.

THE PRIOR ART

Italian Pat. No. 979,365, granted Sept. 30, 1974, and assigned to Montedison S.p.A., describes and claims a process for preparing molded bodies based on expanded polystyrene and comprising, in the following order: polymerizing styrene, adding an expanding agent, preferably during the polymerization, pre-expanding the expandible particles, ageing the pre-expanded particles and molding the pre-expanded and aged particles in a high-pressure-resistant but not gas-tight mold. The polymerization of styrene in such process is conducted in the presence of 0.001–0.5 and preferably of 0.05–0.2 parts percent by weight of an organic brominated compound having the general formula (I) and/or (II)

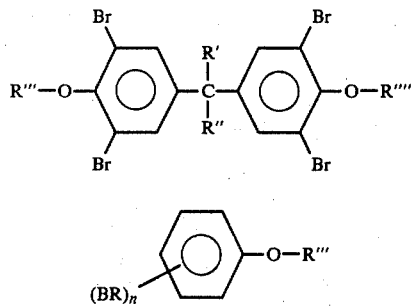

in which R' and R", like or unlike each other, are lower alkyl radicals, preferably methyl or ethyl, optionally halogen-substituted; R''' and R'''', like or unlike each other, are hydrocarbon groups, partially or fully halogenated, preferably with bromine, and containing 1 to 8 carbon atoms, and n is an integer from 1 to 5.

THE PRESENT INVENTION

We have now found that the same effects of the brominated compounds of formula (I) and/or (II) on the expandible polystyrene particles, and on the corresponding molded expanded bodies, are attained when the polymerization of styrene is carried out in the presence of less than 0.5% by weight of at least an ether having the general formula (III) or (IV)

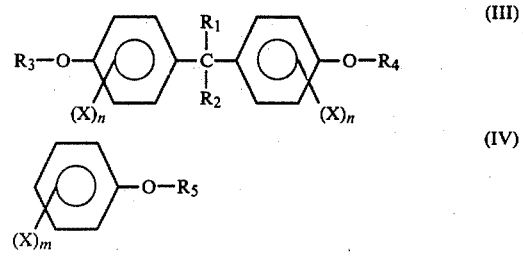

wherein:

$R_1$ and $R_2$, which may be the same or different, are alkyl or cycloalkyl radicals and/or phenyl radicals, optionally halogen-substituted;

$R_5$ is a non-halogenated alkyl radical having 4 to 30 carbon atoms or a fully or partially halogenated alkyl radical having 9 to 30 carbon atoms;

X is a halogen or an alkyl radical, optionally halogenated, having 1 to 8 carbon atoms;

n is an integer from 0 to 4;

m is an integer from 0 to 5, and $R_3$ and $R_4$, which may be the same or different, are alkyl radicals, optionally halogenated, having 1 to 30 carbon atoms, with the exception that, when $R_1$ and $R_2$ are alkyl radicals, X is bromine and n is 2, $R_3$ and $R_4$ are non-halogenated alkyl radicals having 1 to 30 carbon atoms, or fully or partially halogenated alkyl radicals having 9 to 30 carbon atoms.

We have ascertained, in fact, that the expandible polystyrene particles prepared by the process of the present invention, and the expanded bodies, in particular the blocks obtained therefrom, simultaneously exhibit the following compendium of characteristics:

(a) short residence time in the mold, generally equal to and even lower than 50% of the time necessary to cool the block prepared from pre-expanded articles not containing the ethers of formula (III) and/or (IV);

(b) shrinkage of the block thickness lower than 1%;

(c) (total) moisture of the expandible particles lower than 0.3% and practically identical with that of the particles prepared in the absence of the ethers according to this invention;

(d) fine-cell homogeneous structure of the expanded block;

(e) complete absence of odors during the pre-expansion step.

The ethers to be employed either alone or in admixture with one another in the practice of the present invention may be selected from a large number of ethers having general formulas (III) and (IV) as defined herein.

Out of these ethers, those not containing halogens and with $R_3$, $R_4$ and $R_5$ having more than 8 carbon atoms, appear to be especially interesting from an industrial viewpoint.

As specified in detail in the Italian Pat. No. 979,365, the compound or compounds having general formula (III) and/or (IV) are generally added to styrene, or to the monomer mixture containing styrene, prior to or during the polymerization.

Although even small amounts of such substances, such as 0.005% by weight exert a sensible action on the polymer properties, in practice amounts ranging from 0.05 to 0.2% by weight are generally preferred for obtaining the best results. In general, the useful amount of the ethers is from 0.005% to 0.2% by weight.

The term "styrene polymers" as used in this specification and in the claims includes styrene homopolymers, as well as copolymers of styrene with other vinyl and-/or vinylidene monomers, containing at least 50% by weight of chemically combined styrene.

Some examples of such comonomers are alpha-methylstyrene, nuclearly halogenated styrenes, acrylonitrile, methacrylonitrile, esters of the acrylic and/or methacrylic acids with alcohols containing 1 to 8 carbon atoms, N-vinyl-compounds, such as vinylcarbazole, etc.

The styrene copolymers containing, besides styrene and, optionally, units of vinyl and/or vinylidene monomers copolymerizable with styrene, may also contain small amounts of monomers having two double bonds, such as, for example, divinylbenzene.

Besides the ethers having general formulas (III) and (IV), known expanding agents are generally added in the polymerization process of the invention. Particularly suitable expanding agents are the aliphatic hydrocarbons containing 2 to 6 carbon atoms, as such or in mixtures with one another, such as propane, butane, n-pentane, iso-pentane, hexane, cyclohexane and the like, and the halogenated derivatives of aliphatic hydrocarbons containing 1 to 3 carbon atoms, such as, for example, the various chlorofluoro-derivatives of methane, of ethane and of ethylene.

In addition to the expanding agents, the styrene polymers according to this invention may contain other additives, such as, e.g., flame-extinguishing agents, organic and inorganic fillers, dyes, antistatic agents, non-agglomerating agents to prevent crumbs during pre-expansion, plasticizers and other similar adjuvants.

Polymerizing the styrene, preferably in an aqueous suspension, adding the expanding agent, pre-expanding the resulting expandable particles, ageing and transforming the pre-expanded and aged particles into shaped bodies, by molding in closed molds, are carried out according to techniques well-known to those conversant with the art, and which are described in detail in, for example, "Rigid Plastic Foams" by T. N. Ferrigno, Reinhold Publishing Corp., New York, USA (1963).

The following examples are given to illustrate the present invention and are not intended to be limiting.

EXAMPLES 1 to 7

Various polymerization tests were conducted in aqueous suspensions of mixtures made up of:

|  | Parts By Weight |
|---|---|
| styrene monomer | 100 |
| deionized water | 100 |
| polymerization initiator (mixture of tert . butyl-peroxide and tert . butyl-perbenzoate) | 0.20 |
| acrylic acid/2-ethyl-hexyl-acrylate copolymer (ratio by weight = 89/11) as suspending agent | 0.50 |
| NaCl | 0.10 |
| compound having general formula (III) or (IV) of the type and in the amount indicated in the table. |  |

Polymerization was conducted at temperatures varying from 100° C. to 140° C. for a total time period of 20 hours.

During the polymerization, 8 parts by weight of an expanding agent consisting of a mixture of n-pentane and isopentane were added.

After cooling to room temperature, filtering, washing with water and drying at 35°-40° C. for 7 hours, the polymer was screened to obtain expandible polystyrene particles having diameters ranging from 0.9 to 1.6 mm. Said particles contained about 6% by weight of expanding agent.

The expandible particles were additioned with a conventional non-agglomerating agent in an amount equal to 0.15% by weight, the additioning being carried out in a SAGA screwmixer, at room temperature, for about 10 minutes. The expandible particles thus treated were fed to a pre-expander (Erlenbach Mod. K2), with a screw-inlet on the bottom and an outlet for the pre-expanded material from the top, in which they were pre-expanded by means of steam at 95°-100° C. for about 5 minutes. The pre-expanded particles were allowed to age in air, at room temperature, for approximately 24 hours.

The pre-expanded and aged particles were introduced into a Rauscher block-making press until a mold having the dimensions 100×100×50 cm. was filled. Molding was effected by means of steam at 1 kg/cm$^2$ gauge. Density, cooling time, shrinkage of the block thickness and sintering degree were determined on the molded block. The values of such characteristics are given in the following Table.

The cooling time of the blocks is the time required to cause the pressure inside the block to fall to zero, at the conclusion of the treatment with steam.

Both shrinkage and sintering degree of the blocks were determined 48 hours after molding. The sintering degree was evaluated on a thin plate, obtained from the central part of the block by hot-slinging, and determined as the percentage of expanded particles which broke when the plate was broken.

For all the samples, the cellular structure of the expanding beads was found to be homogeneous with fine cells.

Table

| Example No. | 1 | 2 | 3 | 4 | 5 | 6 | 7 |
|---|---|---|---|---|---|---|---|
| Type of compound having general formula (III) or (IV) | — | a | b | c | d | e | f |
| Amount (percent) | — | 0.1 | 0.1 | 0.05 | 0.05 | 0.05 | 0.1 |
| Total moisture content of the expandible particles, in percent | 0.20 | 0.21 | 0.25 | 0.28 | 0.25 | 0.28 | 0.25 |
| Odors during pre-expansion | none | none | none | none | none | none | none |
| Characteristics of the molded block: |  |  |  |  |  |  |  |
| Density, kg/cm$^3$ | 20 | 20 | 20 | 20 | 20 | 20 | 20 |
| Cooling time, minutes | 62 | 34 | 26 | 26 | 32 | 29 | 30 |
| Sintering degree, in percent | 70 | 70 | 70 | 70 | 70 | 70 | 70 |
| Shrinkage of the block thickness, in percent | <1 | <1 | <1 | <1 | <1 | <1 | <1 |

The compounds used according to the Table were:

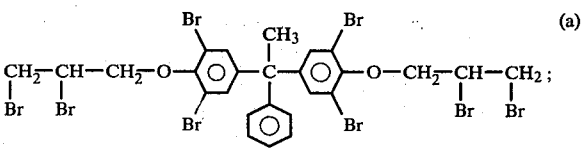
(a)

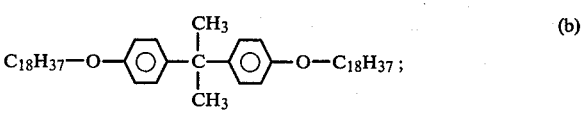
(b)

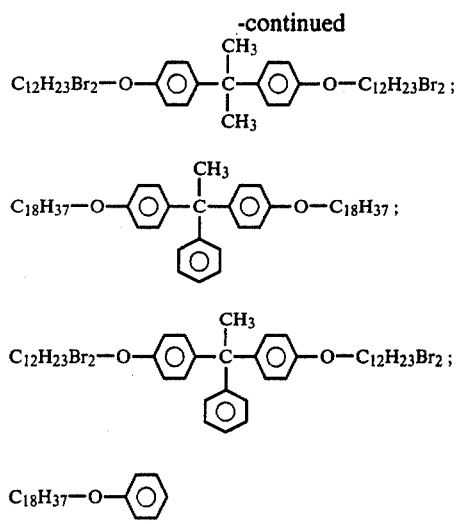

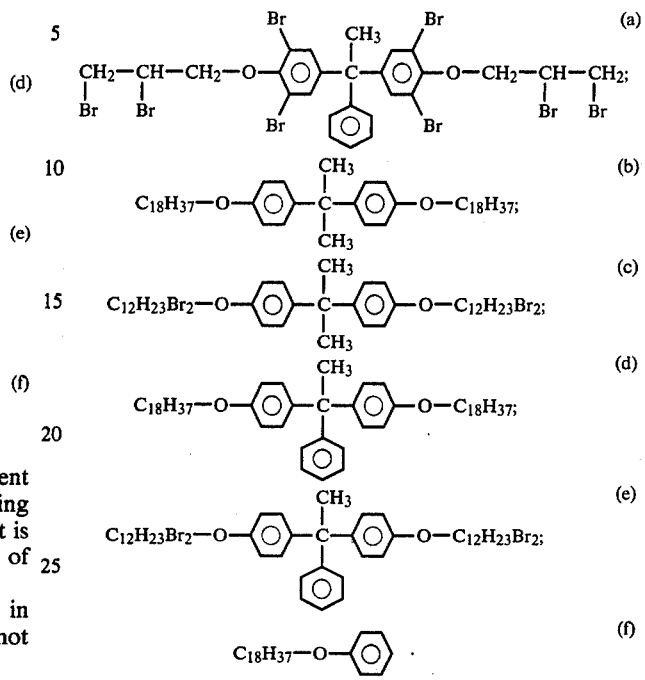

From the values given in the Table, it is apparent that, by incorporating the organic compounds having general formula III or IV in the styrene polymers, it is possible to simultaneously achieve a compendium of commercially desirable results such as:

low moisture content of the expandable particles, in any case of the same value as that of the particles not containing the ethers of the present invention;
    total absence of odors during pre-expansion;
    short cooling time of the blocks;
    shrinkage of the block thickness lower than 1%;
    high sintering degree; and
    fine-cell homogeneous structure.

What we claim is:

1. In the process for preparing expandable particles of styrene polymers wherein the polymerization of styrene or a mixture of styrene and at least one monomer copolymerizable therewith is conducted in the presence of an ether, the improvement which consists in
    (1) shortening the residence time in the mold;
    (2) restricting shrinkage of the shaped body thickness to lower than 1%;
    (3) restricting the total moisture of the expandable particles to less than 0.3%;
    (4) insuring that the expanded shaped body will have an essentially uniform, fine-cell homogeneous structure; and
    (5) eliminating odors during the pre-expansion step, by effecting the polymerization in the presence of from 0.001% to less than 0.5% by weight, on the weight of the styrene or styrene mixture, of at least one ether having one of the following formulae (a) to (f):

2. The improvement according to claim 1, in which the ether of the given formula is used in an amount of from 0.05 to 0.2% by weight based on the styrene weight.

3. The improvement according to claim 1, in which the monomer polymerized is monomeric styrene.

4. The improvement according to claim 1, in which styrene is copolymerized with at least one other vinyl and/or vinylidene monomer copolymerizable with styrene in an amount resulting in a copolymer containing at least 50% by weight of copolymerized styrene.

5. Expandable particles of a styrene polymer prepared according to the process of claim 1.

6. Expandable particles of a styrene polymer containing at least 50% by weight of polymerized styrene and prepared by the process of claim 5.

7. Manufactured shaped articles prepared by molding expandable particles of a styrene polymer prepared according to claim 1 in a pressure-resistant but not gastight mold.

* * * * *